(12) United States Patent
Tsao

(10) Patent No.: US 8,473,596 B2
(45) Date of Patent: *Jun. 25, 2013

(54) METHOD AND APPARATUS FOR WEB BASED STORAGE ON-DEMAND

(75) Inventor: Sheng Tai (Ted) Tsao, San Jose, CA (US)

(73) Assignee: Sheng Tai (Ted) Tsao, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/944,958

(22) Filed: Nov. 12, 2010

(65) Prior Publication Data

US 2011/0125889 A1   May 26, 2011

Related U.S. Application Data

(60) Division of application No. 12/013,813, filed on Jan. 14, 2008, which is a division of application No. 10/713,905, filed on Aug. 12, 2002, now Pat. No. 7,379,990, application No. 12/944,958, which is a continuation-in-part of application No. 12/079,482, filed on Mar. 27, 2008, which is a division of application No. 10/713,904, filed on Aug. 6, 2002, now Pat. No. 7,418,702.

(60) Provisional application No. 60/402,626, filed on Aug. 12, 2002.

(51) Int. Cl.
*G06F 15/173* (2006.01)

(52) U.S. Cl.
USPC ............................................. 709/223; 709/220

(58) Field of Classification Search
USPC .................................................. 709/220, 223
See application file for complete search history.

(56) References Cited

U.S. PATENT DOCUMENTS 7,287,063 B2 * 10/2007 Baldwin et al. ............... 709/216
7,290,045 B2 * 10/2007 Mandal ......................... 709/223

* cited by examiner

*Primary Examiner* — Adnan Mirza

(57) ABSTRACT

Rapid demanding for storage capacity at internet era requires a much flexible and powerful storage infrastructure. Present invention disclosed a type of storage system based a model of centrally controlled distributed scalable virtual machine. In this model, one or more service pools including virtual storage service pool and application service pools can be automatically created to meet the demands for more storage capacity from various applications. Specially this model provide a solid foundation for distributing storage volumes for supporting storage on-demand and sharing with exceptional management capabilities.

19 Claims, 10 Drawing Sheets

Distributed Virtual SAN Infrastructure

Distributed Virtual SAN Infrastructure

The UDP packet format used by "Virtual SAN Auto Configuration Protocol"

Example of Storage Volume Information of an IP SAN Unit

Note: Each volume may further be partitioned into small chunk of partition.

Direct Attached Storage System:

In-Band Accessed Virtual SAN

The typical hardware components of a computer system such as for a control management system, system units including storage units, host, and console host:

METHOD AND APPARATUS FOR WEB BASED STORAGE ON-DEMAND

CROSS-REFERENCE TO RELATED APPLICATION(S)

The present application is a divisional patent application based on U.S. patent application Ser. No. 12/013,813 filed on Jan. 14, 2008, which in turn itself is a divisional application of the U.S. patent application Ser. No. 10/713,905, filed on Aug. 12, 2002 that is converted from provisional application 60/402,626 and now is a U.S. Pat. No. 7,379,990. The application Ser. No. 10/713,905 had tried to claim as a continuation application of a pending application on the filing date, yet referenced a provisional application No. 60/401,238 of said pending application, that is filed under the name of the same inventor. This application is also a continuation in part of parent application Ser. No. 12/079,482, which itself is a divisional application of U.S. patent application Ser. No. 10/714,904 that is converted from provisional application 60/401,238 and now is a U.S. Pat. No. 7,418,702. All above applications are herein incorporated by references in their entireties for all purpose.

FIELD OF THE INVENTION

The present invention generally relates to computer communications network. More specifically, the present invention relates to web based data storage systems.

BACKGROUND OF THE INVENTION

Today's corporate IT professionals typically face many challenges to handle the ever increasing information and data. To handle large amount of data, many organizations expand their storage capacity by employing manage storage systems locally in order to maintaining their normal business operating. A conventional approach is to use IP based network attached storage ("NAS"), which effectively provides data storage and services for end users. Moreover, at the enterprise level, the majority storage systems are directly attached or connected to server(s) or host(s) as shown in FIG. 7. These server(s) and/or host(s) are typically access to storage devices through conventional communication connection media, such as traditional IDE, SCSI, Fibre Channel, or Ethernet.

The server, which is directly attached to a storage system as illustrated in FIG. 7 typically has many drawbacks, which are described as following:

a typical conventional storage management system is only capable of handling 4 TB (terabytes) of data, which is usually not good enough for an enterprise storage system;

The most of servers, which are directly attached to storage systems, have problems for further expanding their storage capacity. For example, it may require to purchase new servers in order to increase storage capacity;

The storage being attached to a server can only be accessed by the attached server and can not be shared by other servers even if server's storage availability is not evenly distributed across all servers within a organization;

Each attached storage system has to be managed separately and this is a nightmare for IT professionals;

With the attached storage system, the backup/restore has to go through the data network, this will tax or reduce the network performance;

A typical SCSI connection only allows a 12-meter distance for data accessing with 15 storage devices. Similarly, Fibre Channel is limited to 10 kilometers communication distance. Distance limitation effectively prevents them from being the best choice for disaster recovery of the storage system; and The Fibre Channel based storage system cannot handle well for the interoperability. Also, Fibre Channel based storage system is expensive to build and to maintain.

FIG. 8 shows a conventional type of virtual SAN, which is in-band controlled and accessed with which the data path from hosts 1 to the SAN units 4 going through virtual SAN control management station 2. It is not efficient in term of accessing the data by the hosts because the virtual SAN control management station can easily be a performance bottleneck. Similarly, the scalability of this type of virtual SAN is poor.

SUMMARY

With rapid development of high speed communication technology, the problems mentioned above can be solved by an IP based out-band accessed distributed virtual SAN infrastructure illustrated in FIG. 1 of present invention. In one embodiment referencing to the FIG. 1, each host 1 can directly access IP based SAN units 4 without going through control management station ("control system") 3. The IP based out-band accessed distributed virtual SAN actually represents an example of a central controlled distributed scalable virtual machine system (CCDSVM illustrated in FIG. 9. Wherein, each of the system units actually is a SAN unit 4, specifically is an IP based SAN unit.

In one embodiment, each SAN unit 4 of the distributed virtual SAN can be accessed by one or more hosts 1 and each host can access one or more SAN units 4 as illustrated in FIG. 6. Therefore, every storage volume can be fully utilized without wasting a bit of capacity. In addition, the storage access goes directly through communication link of a network infrastructure (2 of FIG. 1) between the hosts 1 and SAN units 4 without involvement of the control system 3. Further, a SAN unit 4 of the virtual SAN can be dynamically added or removed without interrupting other of the SAN units 4 to be access by hosts 1. In addition, all SAN units are centrally controlled, monitored, and managed by a control system 3 through a management console 10 residing on a console system 14. The control system 3 may also accept storage volume/partition requests from each of the hosts (1 of FIG. 1), and assign the matched volumes/partitions of the SAN units 4 to these requested hosts 1. Therefore, each host 1 could directly and efficiently access the right volumes/partitions of assigned SAN 4 units without interfering each other and without going through the control system again. In addition, the backup and restore will not go through data network, therefore, it will enhance the performance and flexibility for the backup/restore operations.

This invention will become understood with reference to the following description, claims, and accompanying figures.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The following terms are used through out this patent application to describe the present invention. A central controlled distributed scalable virtual machine ("CCDSVM") system in one embodiment allows a control management system to control a group of computing systems and to provide distributed services to client systems over an Intranet, the Internet, and/or LAN environment. Storage media includes magnetic hard disk drives, solid state disk, optical storage drive, and memory card etc. Storage connection and control media may include controller of IDE, SCSI, Fibre optical, Ethernet, USB, or wireless media, and/or other related cables etc. Each controller of the storage media such as Raid, IDE, or SCSI controller may control multiple storage devices on a computing system. Storage system includes one or more storage devices, storage connections, and/or storage media controllers. Storage system also contains related software modules for delivering storage services. A storage volume or partition is a unit of usable storage space having an unique storage address with a fixed length being configured in a storage device.

Storage area network ("SAN") is a storage system that is capable of providing block data services to various computer devices through storage connection and control media, such as Fibre-optical cable, Ethernet or other said media using protocol based on Internet Protocol ("IP") or non-IP based protocols. The non-IP based connection and control media protocol, in one example, includes Fibre-Channel. IP SAN uses IP based protocol to provide storage raw block data services. All discussions of the SAN in this invention are within the scope of a central controlled distributed scalable virtual machine ("CCDSVM").

DNS stands for domain name service for the Internet network. DNS is an Internet software infrastructure and is capable of identifying and resolving network addresses and name for computing systems across a network. A Simple Network Management Protocol ("SNMP") is a standard Internet protocol. A SNMP trap is a user datagram protocol ("UDP") packet, which may be used to send by a SNMP message from a SNMP agent system to a SNMP network management station via network links.

Figure 1:
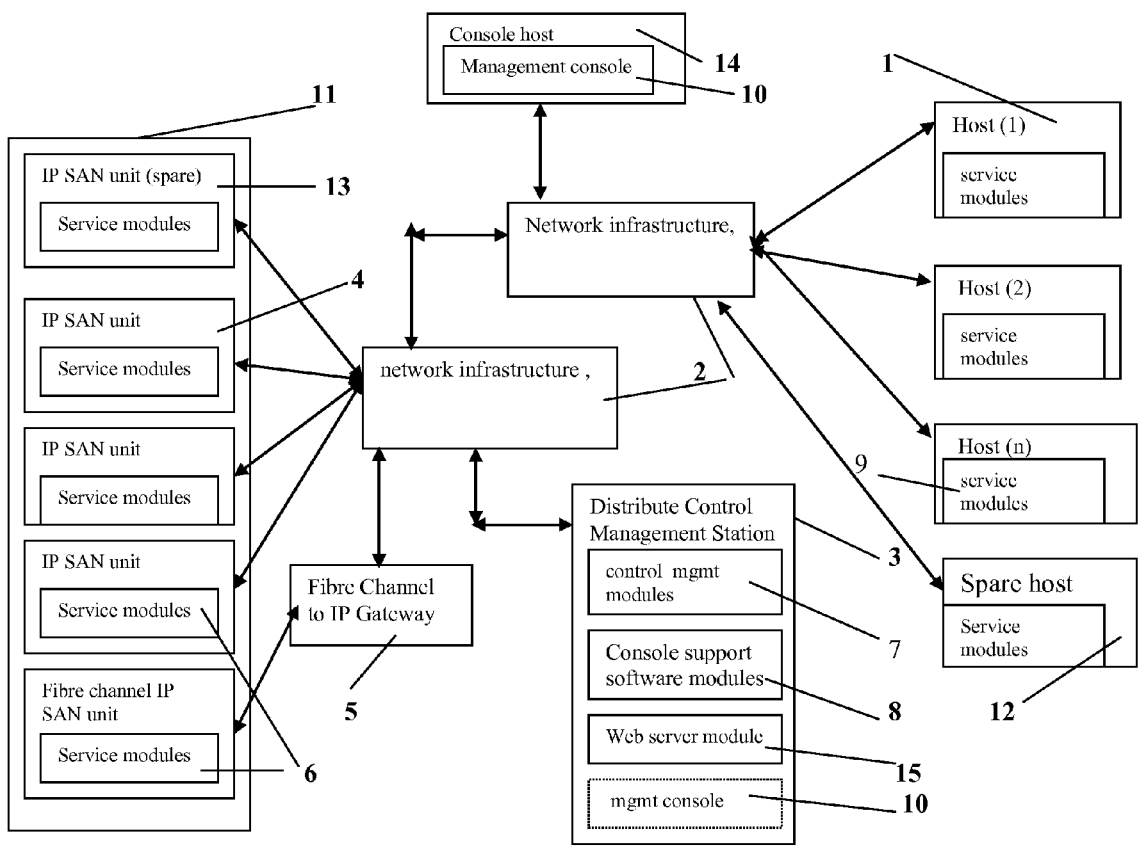
FIG. 1 illustrates a distributed virtual storage area of network ("SAN") infrastructure in accordance with one embodiment of the present invention.

FIG. 1 shows an example of a simplified block diagram of IP based out-band accessed distributed virtual SAN infrastructure. The distributed virtual SAN infrastructure includes multiple hosts 1, network infrastructures 2, a control management system 3, a virtual storage pool 11 having multiple SAN units including IP SAN unit 4, spared SAN unit 13 and fiber channel SAN unit which connected via fiber-channel-to-IP gateway, and a management console 10 residing in a console host 14. In one embodiment, each host 1 contains service software modules 9. The service software modules 9 are configured to communicate with a control management software module 7 of the control management system 3 for obtaining information of the virtual SAN, for one example to get the storage information on a specific SAN unit 4. The service software modules 9 of the host 1 also capable to communicate with service software modules 6 of a SAN unit 4 to read block data therefrom or write block data thereto. The service software modules 9 can be coded or implemented with any suitable programming languages such as C, C++, Java or others. The service software modules 9 may also use any suitable protocols such as IP based or non-IP based protocols.

The host 1, in one embodiment, could be a server, a desktop, a laptop PC, or a personal communication device such as a PDA or a cell phone etc., which is configured to access block data in storage devices. In another embodiment, the host 1 is capable of creating at least a local file system by utilizing at least a storage volume on a SAN unit 4 in addition to utilizing its own storage volume on its local storage device. In one more embodiment, the host 1 may creating at least a local database by utilizing at least a storage volume on a SAN units 4 in addition to utilize its own local storage devices. In addition, at least a spare host 12 can be deployed in the virtual SAN infrastructure, wherein the spare host 12 represents a part of recovery scheme that could be implemented for providing service replacement for a failed host 4 in the CCDSVM environment, and each spare host 12 can serve multiple hosts.

Network infrastructure 2 can comprise various types of communication links. The network infrastructure could be one of a corporate storage network, a local area network ("LAN"), a corporate intranet, the Internet, a wide area network ("WAN") or other-network without limits. In one embodiment, network infrastructure 2 includes switches, routers, gateways, cables (Ethernet, optical Fibre), wireless communication media, or others without limits. The network infrastructure 2 provides data path between the hosts 1, the distribute control management system 3, and the SAN Units 4. The network infrastructure 2 also includes software infrastructure such as DNS or DHCP for facilitating each of computing systems on the network to identifying a target computing system's addresses for ease of sending or receiving data within a network domain or in a cross-domain network environment.

It should be noted that DNS and/or other Internet address identification mechanism may be used when a message or other data is sent from a system A to a system B via a communication link of the network infrastructure 2.

Control management system 3 includes distributing control management software modules 7 and console support software modules 8. To support web-based console, it requires web server software modules 15. The distribute control management software modules 7, in one embodiment, communicate with the service modules 6 of a IP SAN unit to retrieve storage information for constructing a virtual SAN storage service pool 11. The communication between the distributed control management software modules 7 and the service modules 6 of a IP SAN unit 4 is further configured to monitor IP SAN unit 4, and to perform various system operations, which include storage configuration and partitioning etc. The control management software modules 7 also communicate with service software modules 9 of each of the hosts 1 for distributing storage volumes to the each of the hosts 1. The distribute control management software modules 7 can be implemented with any suitable programming languages such as C, C++, Java, XML, etc. The communication protocols between the control management system 3 and each of the IP SAN units 4 could be any suitable IP based protocols. The communication between the control management system 3 and the hosts 1 can be any suitable IP base or non-IP based protocols.

The console support software modules 8 employ inter-process communication mechanism to obtain information relating to the IP SAN units 4 and the host 1 from the distributed control management software modules 7. The console support software modules 8 actually also plays a role for web server interface which operatively coupled to web server software modules 15 through the inter-process communication mechanism for providing web services and web user interfaces ("UI") that include sending information of the SAN units 4 and hosts 1 to a console system 14 for displaying the information via the management console 10. In one embodiment, the console support software modules 8 coupled to the web server modules 15 and coupled to the control management modules 7 for supporting web based multi-tasking, so that the control management system 3 controls each user via a web browser being executed on a computing device such as a console system 14 to be capable of submitting one or multiple concurrent tasks for the CCDSVM without blocking or freezing the web browser screen displaying. In one example, a user space task list along with a lock protection can be used to store each task transmitted from each web browser.

In another embodiment, the following actions can be performed on the control management system 3 for supporting web multi-tasks: a) repeating in a loop to receive and parse one or more requested tasks from each web browser being executed on a computing device, and for each parsed task performing following steps: b) acquiring the lock that protects the user space task list, storing the task information into a not used entry of the user space task list, then releasing the lock; c) run the task into the background and to be distributed and executed on one or more targeted systems; d) providing a response web page including the task status back to the web browser without waiting for the completion of the task, wherein if the target system is a control system, then get status from the control system itself and if the targeted system is a system unit such as IP SAN unit, then get the task status from the system unit; wherein the task status could be a failed status if the task execution failed, or can be the task executing status or a result status if there is needs; e) cleaning up the task information in the corresponding entry of the user space task list up on the completion of the task.

Therefore, the user is capable of checking the task status regardless if the task is finished or not, and of course in another embodiment the user is also able to submit other tasks since the web browser displaying screen will never freezing or blocking. In one more examples, more locks may be deployed during the entire task executing to protect other resources related to the task. In another embodiment, non-web based networked user interface can be supported with similar steps described above. The console support software modules 8 and web sewer software modules 15 can be implemented with any suitable programming languages such as C, C++, Java, XML, etc. can be implemented with any suitable programming languages such as C, C++, Java, XML, etc.

The web server software 15 communicates with the management console software 10 on the console host 14 through web protocol such as HTTP for displaying the information of the virtual SAN infrastructure via execution of the management console 10 (web browser) in the console host. The web server software (15) together with the console support modules and the distributed control management modules 7 are configured to provide end users a centralized management capability for managing the entire distributed virtual SAN infrastructure across the network. The web server software 15 could be commercially available software on the market such as Apache or IIS or other proprietary software.

To simplify foregoing discussion, the communication path mentioned above will be simply referred to as the console support software modules 8, which communicate (send/receive) with the management console 10 on the console host 14 (without further mentioning the role and function of web server software 15 on the control management system 3.

In addition, to support non-web based console, the web server software 15 on the control management station (3) is often not required. In this case, the console support software modules 8 could communicate with the management console software 10 with a suitable protocol other than a web protocol such as HTTP.

Figure 5:
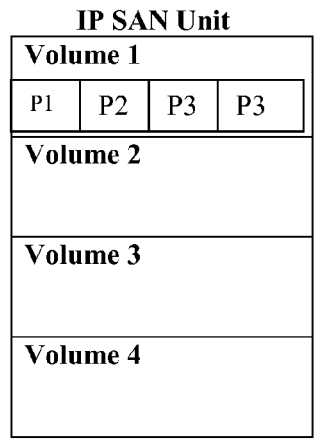
FIG. 5 illustrates an Example of Storage Volume Information of an IP SAN Unit in accordance with one embodiment of the present invention.

The virtual storage pool 11 includes multiple SAN units 4 such as IP SAN and fiber channel SAN units, wherein each SAN unit further includes service modules 6. Each SAN unit 4 further contains storage media, storage communications and control media. The storage hardware media of each SAN unit 4 is configured to have one or more logical volumes. Each volume, in one embodiment, is further partitioned into several portions, as shown in FIG. 5. The service software modules 6 of the SAN unit 4 further contain block data services and other service software modules. The service software modules 6, in another embodiment, is configured to communicate with the distribute control management station 3 for providing storage information and for performing storeage operations based on received request. The service software modules 6, in another embodiment, are further configured to communicate with the service software modules 9 of hosts 1 for providing block data services directly to the host 1. The service software modules 6 can be implemented by any suitable programming languages such as C, C++, Java, etc and they may employ any suitable IP based communication protocols for data read and write. Each mentioned software modules comprises programming instruction codes which are capable of creating processes and threads to be executed by the mentioned computer system step by step for carrying out one or more designated tasks.

In one embodiment, the control management system 3 and organizes the SAN units 4 to form the virtual storage service pool 11. The information of the virtual storage pool 11 is kept and maintained via a SAN unit information list in which every entry on the list comprises the information of a storage unit 4 including its name, IP addresses, status, and the storage volumes, each volume's block data addresses and size for each SAN unit 4. The presence of a spare IP SAN unit 13 represents a part of recovery scheme used in the centrally controlled distributed scalable virtual machine environment.

Fibre channel to IP gateway 5 is a component that is configured to provide translation between Fibre Channel based protocol and IP based protocol so that Fibre Channel based SAN unit 4 will appear as if a IP based SAN unit to the control management system 3 and host 1.

Fibre channel SAN unit 4 is similar to an IP SAN unit 4 except it uses Fibre Channel storage control media and uses Fibre Channel protocol to communicate with other parties over the network. In addition, Fiber Channel SAN unit 4 appears as an IP based SAN unit 4 once it connects to a Fiber Channel to IP gateway 5 in the network infrastructure 2 of the distributed virtual SAN infrastructure. Therefore, to simplify the foregoing discussion, the fibre channel SAN unit will be treated similarly as an IP SAN unit 4 in the virtual storage pool and in all of following discussion without additional comments.

The web based multi-tasking support for management console (web browser) 10 on the console host (14) of the CCDSVM has been described in the pending patent application entitled "*Concurrent Web Based Multi-Task Support for Control Management System*" application Ser. No. 12/079,482, filed on Mar. 27, 2008 by the same author of present invention, and here in incorporated in its entirety by reference. The management console 10 could be a commercially available web browser 10 on the market or a proprietary Web browser 10. A web browser 10 is operable to communicate with the web server software 15 of the control management station 3 through a web protocol such as HTTP. The Web browser could be implemented by any suitable programming languages such as C, C++, Java, XML, etc. In addition, the management console software module 10 could be a networked software module instead of web browser software for supporting non-web based management console 10. In this case, any other suitable network protocols can be used instead of using web protocol such as HTTP.

To simplify the foregoing discussion, the communication path between management console 10 of the console host 14 and the console support software modules 8 of the control management system 3 will not further mention the role or function of web server software module 15 in this invention.

From the management console 10, multiple system operations and tasks can be performed for the entire distributed virtual SAN infrastructure. There are may be one or more management consoles 10 of distributed virtual SAN infrastructure anywhere on the network infrastructure.

Figure 2:
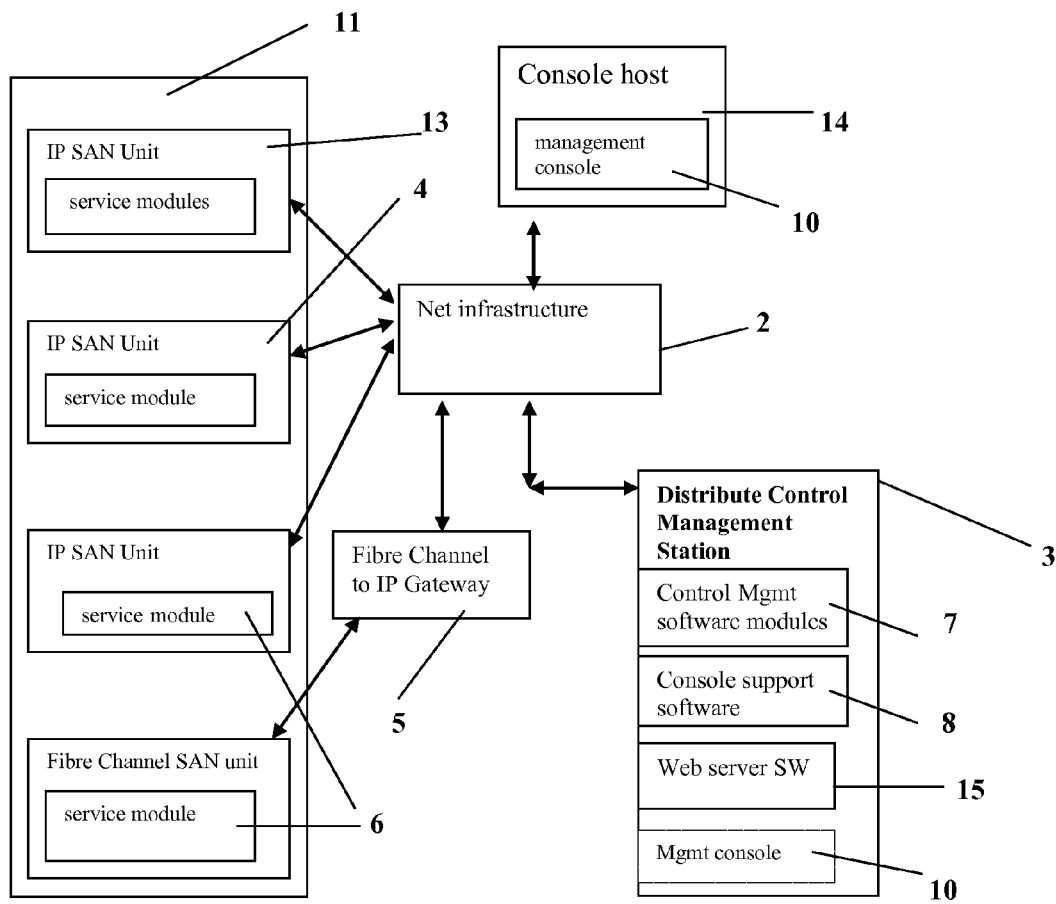
FIG. 2 illustrates actual Components of Distributed Virtual SAN in accordance with one embodiment of the present invention.

FIG. 2 illustrates a portion of FIG. 1 relating to the core part of the virtual SAN. The multiple SAN units 4 form a virtual Storage pool 11. The virtual storage service pool 11 may contain information of each SAN units' IP address, the storage volumes and their sizes, etc.

Figure 3:
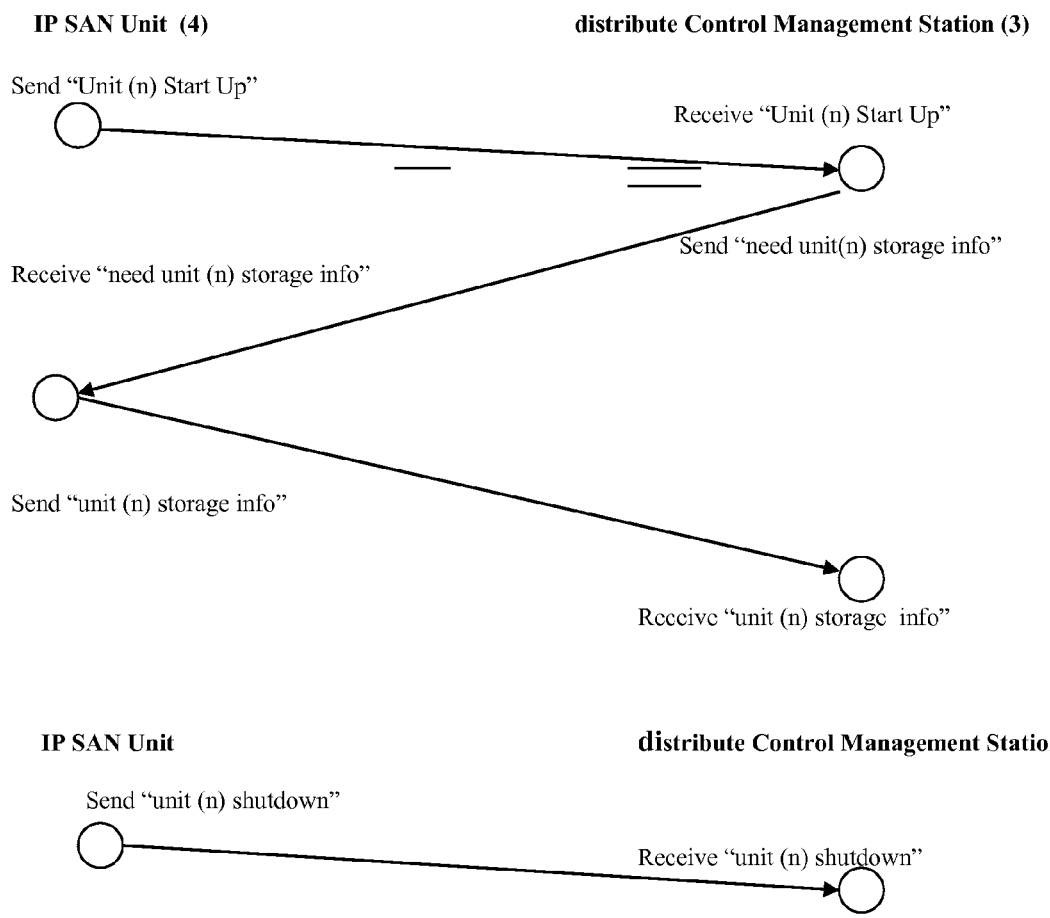
FIG. 3 illustrates Virtual SAN Automatic Configuration Protocol in accordance with one embodiment of the present invention.

FIG. 3 shows a protocol of virtual SAN automatic configuration and building as well as shutting down a SAN unit 4. The packet format used with this protocol is described in FIG. 4.

Figure 4:
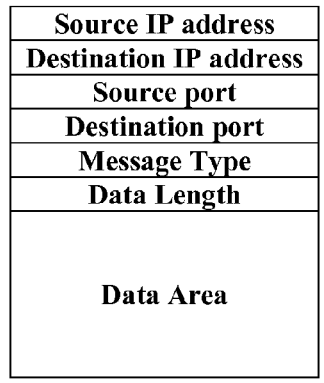
FIG. 4 illustrates a Virtual SAN Auto Configuration Protocol Packet format in accordance with one embodiment of the present invention.

FIG. 4 shows the communication packet format, which is used by "Virtual SAN Automatic Configuration Protocol" for sending and receiving messages via a packet.

FIG. 5 illustrates a storage layout in an IP SAN unit, wherein the storage layout may be further divided into multiple volumes and each volume may be further divided into multiple partitions. Each volume refers to a logical storage unit in this discussion and it might contain multiple pieces of storage spaces from multiple storage hardware media.

Figure 6:
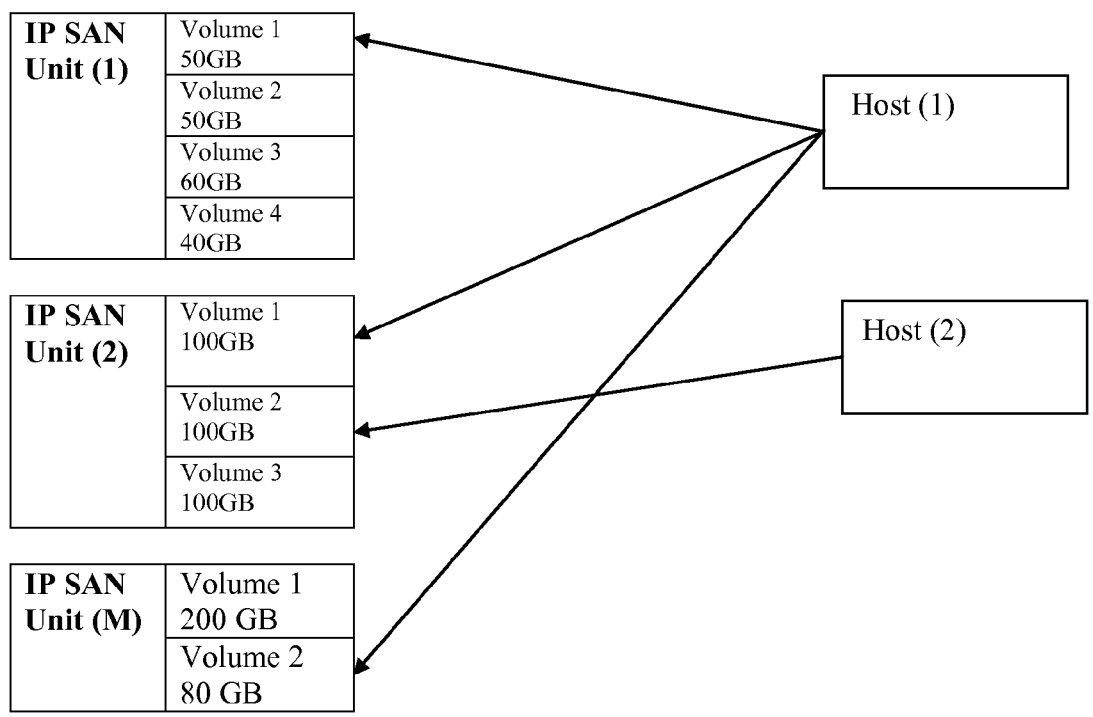
FIG. 6 illustrates a hypothetical example of Storage Volume Requests and Assignment in accordance with one embodiment of the present invention.

FIG. 6 is a simplified and a portion of FIG. 1, which shows a hypothetical example of how hosts are configured to access the Storage Volumes of SAN units 4. Where each SAN unit 4 is a portion of virtual storage pool (11 of FIG. 2) and each of the host 1 is presented in the FIG. 1.

Figure 8:
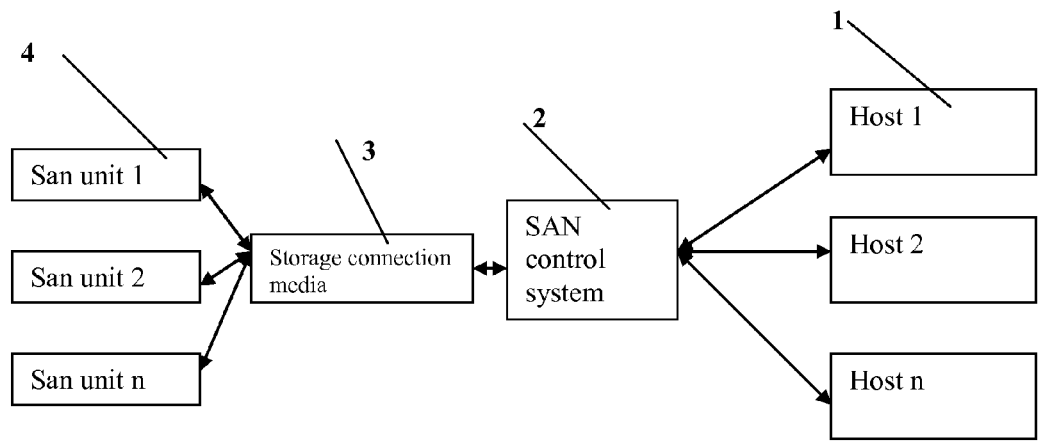
FIG. 8 is an In-Bound Accessed Virtual Storage System.

FIG. 8 is a block diagram illustrating an In-Band Accessed Virtual SAN. FIG. 8 shows another type of virtual SAN, wherein, the actual storage data path from hosts to IP SAN units has to go through control management station.

Figure 9:
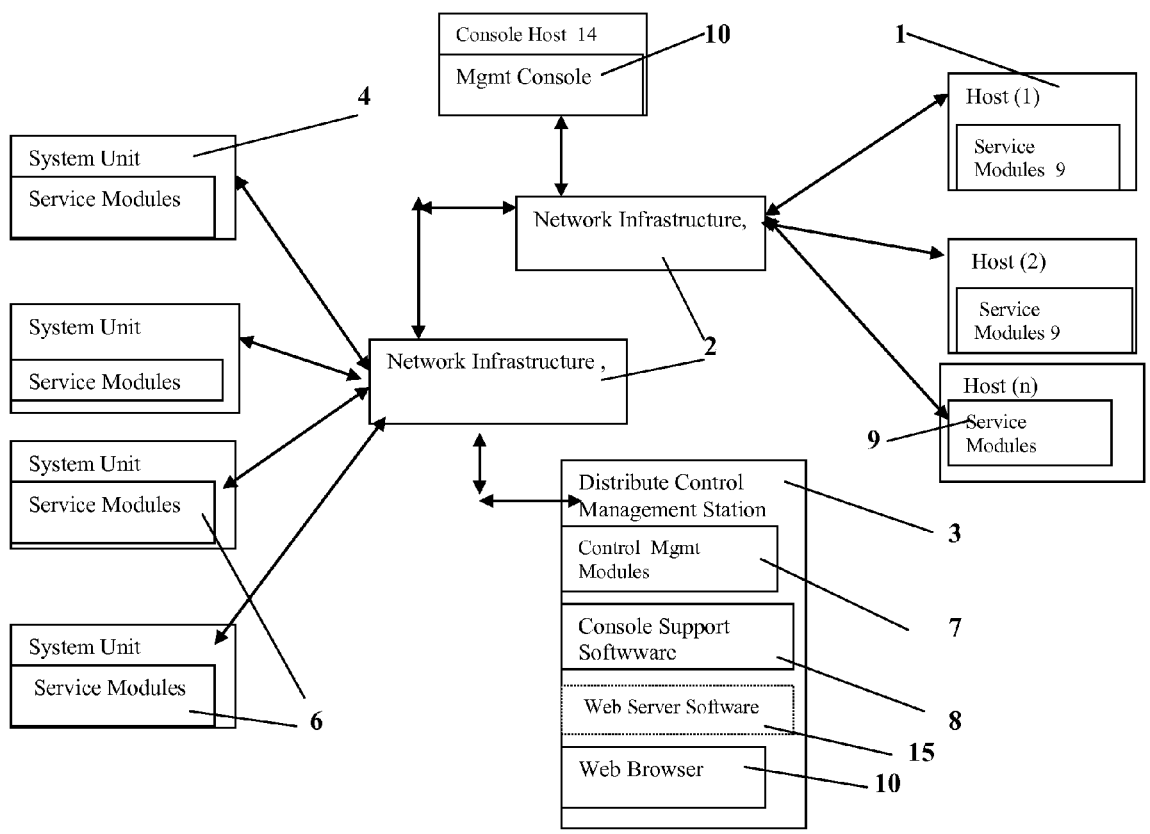
FIG. 9 illustrates a Simplified Diagram of Central Controlled Distributed Scalable Virtual Machine System in accordance with one embodiment of the present invention.

FIG. 9 is a Simplified diagram of central controlled distributed scalable virtual machine. With this invention, the computing systems in a CCDSVM can be flexibly organized into multiple different service pools according to their functionalities. For example, system units 4 such as multiple IP SAN units 4 can form a virtual SAN storage pool. The hosts of the CCDSVM could form other service pools to provide services such as video services, security monitor services, database service, file service, web service and all other services provided across the world wide web or any type of communication network. In an additional embodiment, multiple NAS ("network attached storage") units 4 can form a virtual NAS storage pool, wherein each NAS can provide at least a local file system residing in the NAS to at least a remote host which deploys the NAS' local file system remotely as if it is the host's local file system via communication to the NAS unit. Also, all service pools of the CCDSVM shall have similar advantages as the virtual SAN storage pool has, such as automatic configuration and provisioning, dynamic capacity scaling and expansion by adding or removing one or more system units dynamically, improved performance, backup and restore, fault handling and disaster recoverability, multi-level security control, centralized manageability, and support on-demand services to the client (host) systems 1.

Figure 10:
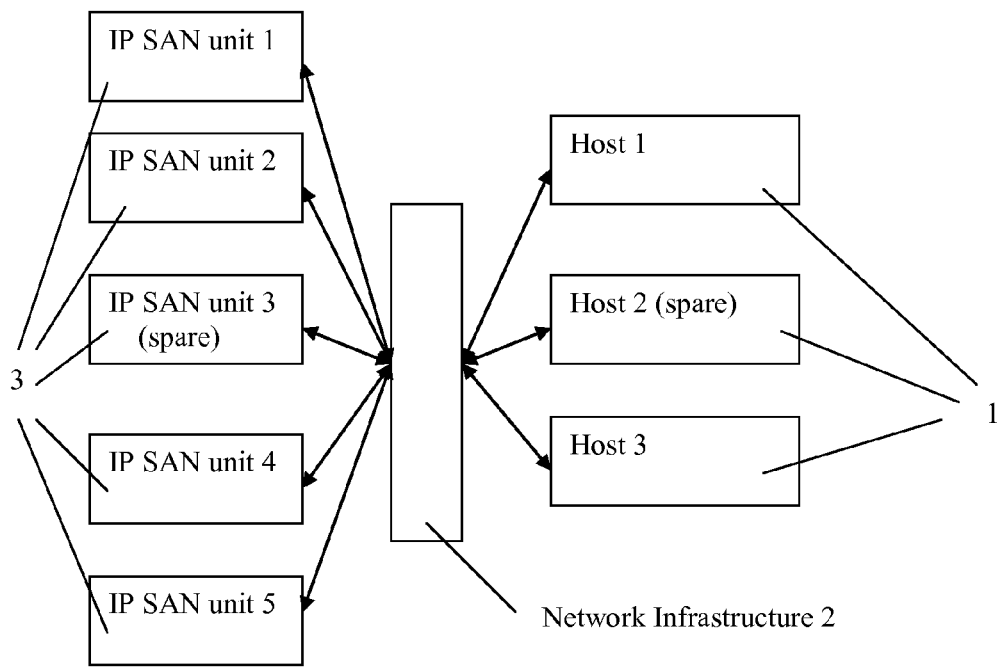
FIG. 10 illustrates a Simplified Diagram of Disaster Recovery Scheme of Distributed Virtual SAN Infrastructure in accordance with one embodiment of the present invention.
Figure 11:
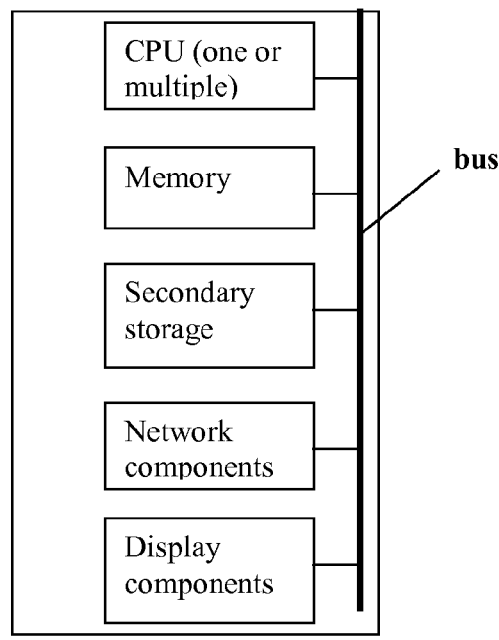
FIG. 11 illustrates the typical hardware components of a typical computer system for said control management system 3, system unit such as storage unit of IP SAN unit 4 and spare IP SAN unit 13, host 1, and console system 14. It comprises one or multiple CPU, memories, secondary storages such as disk or memory sticks, network interface cards and display components such as monitors or others. These components are connected through bus or cable.

FIG. 10 is a embodiment of a disaster recovery scheme of distributed virtual SAN infrastructure, which includes one virtual storage pool 11 of multiple SAN units 4 and one service pool of multiple hosts 1. For example, host-1 1 can access to IP SAN unit-1 4 and IP SAN unit-2 4 while host-3 1 is configure access to IP SAN units-4 4 and IP SAN unit-5 4. Also, IP SAN unit-1 and uni-2 are mirrored so that they have kept the same copy of data for the host-1 1. Therefore, whenever one of IP SAN failed, the minored one can continue providing storage service to the host as commonly practiced in the industry. The same to be true for IP SAN unit-4 and unit-5 with host-3 (1). That is the IP SAN unit 4 and 5 are minored so that they have kept the same copy of data for host-3 1. In addition, a IP SAN unit-3 4 may be a spare unit to provide fault replacement when a mirroring IP SAN unit having fault and the host-2 1 could be a spare host for providing fault replacement when any one of the host-1 or host-3 having fault occure.

FIG. 1 shows a simplified diagram of a distributed virtual SAN infrastructure according to the present invention. With the distributed virtual SAN infrastructure, the distributed virtual SAN storage service pool 11 comprises one or more SAN units 4, which may be further connected to a distribute control management station 3. The SAN units 4 can be accessed by one or more hosts 1 via the network infrastructure 2. The entire distributed virtual SAN infrastructure can be operated through the execution of the management console 10 on the console system 14.

A hundreds and thousands terabytes of a virtual storage volume pool 11 of the distributed virtual SAN infrastructure can be constructed and updated when each of the SAN units 4 is booted and brought to online. The virtual storage volume pool 11, in one embodiment, is updated when at least one of SAN unit is powered down or removed from the distributed virtual SAN infrastructure. FIG. 3 shows one embodiment of the distributed Virtual SAN Automatic Configuration Protocol, which leads to the success of constructing the virtual storage pool 11 of the distributed virtual SAN infrastructure according to this invention. The following are automatic sequence steps for building the storage volume pool 11 of the virtual SAN based on this protocol illustrated in the FIG. 3. The protocol described bellow could utilize IP based protocol such as SNMP, or a much simple UDP protocol as illustrated in FIG. 4, or any other suitable protocols.

In one embodiment, when any IP SAN unit 4 such as an unit (n) brought up online, the SAN service modules 6 of the IP SAN unit 4 sends out a "SAN unit (n) startup" packet to indicate either the SAN unit is power up or a previously downed network is up again, to the distribute control management system. The "SAN unit (n) startup" packet could be a simple user defined UDP packet illustrated in the FIG. 4 with a message type of system up. The message carried by the packet could also be a SNMP trap of cold start packet, or link-up packet or other short packet/message of any suitable IP protocols.

When the distribute control management modules 7 of the distribute control management system 3 receives the IP SAN unit (n)'s packet, it stores the IP SAN unit (n)'s information into a SAN unit information list on the distribution control management system 3.

After storing the information of the IP SAN unit (n) into the SAN unit information list, the control management modules 7 of the distribute control management system 3 sends back a "need SAN unit (n)'s storage info" packet to the IP SAN unit (n) 4.

When the SAN service modules 6 of the IP SAN units (n) 4 receive the packet of "need SAN unit (n)'s storage info", it obtains the storage information of the IP SAN unit (n) 4 and encoded the obtained information into a packet as illustrated in Fig. 4, which includes the number of storage volumes, each volume's starting address (logical block address, LBA), length, and the end address (logical block address, LBA). The SAN service modules 6 then send the packet of "unit (n) storage info" back to the control management system 3.

After receiving the "unit (n) storage info" packet from the IP SAN unit (n) 4, the distribute control management modules 7 of the distribute control management system 3 updates the stored SAN unit information list for the virtual storage pool 11 with the corresponding storage information of the IP SAN units (n) based on the received information from the packet.

When any one of IP SAN unit (n) is shutting down or a communication link of a IP SAN unit (n) is down, the service module 6 the IP SAN unit (n) 4 sends a "Unit (n) shutdown" packet to the distribute control management system 3. This shutdown message could bean SNMP trap of link down, or a simple UDP packet illustrated in FIG. 4 with a message type of system down, or could be other short packet based on some other protocols.

After detecting and receiving the "unit (n) shutdown" packet from the IP SAN unit (n) 4, the distribute control management modules 7 the distribute control management system 3 updates the information of the virtual storage pool 11 via the SAN unit information list for the specific IP SAN unit (n), where in one embodiment the updated information could be the total size of the capacity of the virtual storage pool, could be the hosts' storage volume allocation (mapping) information, and could be the status down for the SAN unit (n), wherein the letter "n" could be a number starting from "1" with sequence order for representing a SAN unit. The method and principles of automatic constructing the virtual storage pool 11 can be applied for various other virtual machines such as for virtual video server, database server, web server, file server, etc. without limits; For one example, the SAN unit described above may be replaced by a video sewer, and the "storage info" in the packet for the protocol sequence can be replaced with the "video service info" etc. for constructing a different type of service pool such as for a virtual video pool or a virtual database pool etc. without limits.

After one or more SAN units 4 are online, and the control management system 3 obtains and stores the information relating to the storage volumes for every SAN unit 4 in the virtual storage pool 11. Therefore, the control management system 3 is able to accept block data request from a plurality of hosts 1 and redirect and distribute the requested storage volumes in the virtual storage pool 11 to each requested host 1 in several steps as follow.

First, as illustrated in FIG. 6, in one embodiment a host-1 1 sends a request to the control management system 3 for requesting a specific sized storage space, such as 80 GB (gigabyte) of storage. Second, the control management system 3 receives and stores the host-1's information and searches for the availability of the 80 GB of storage volume of a specific SAN unit 4 in the virtual storage pool 11. The control management system 3, for example, identifies an volume 2 which is 80 GB in size and is available for service on a SAN unit-M. Third, the control management system 3 sends the information of the host-1 to the SAN unit-M, wherein the information includes the IP address of the host-1, the requested storage size and the identified storage volume. The control management system 3 also sends identified storage volume information relating to the SAN unit-M to the host-1, wherein the storage volume information includes the IP address of IP SAN unit-M, the volume number and the size, the volume's starting address, and volume's ending logical address block (LBA). Therefore, all parties of three, namely the control management system 3, the host-1 and the SAN unit-M keep and synchronize synchronize the same storage volume assignment and mapping information for the SAN unit information list. Fourth, once the host-1 1 and the SAN unit-M get each other's information, the host-1 1 can directly and independently access the volume 2 on SAN unit-M immediately and the SAN unit-M, in one embodiment, is further configured to perform security checking in light of storage access based on the received mapping information.

Alternatively in another embodiment, the above described steps may also be semi-automatically setup with assisting of system operations performed from the management console 10 on a console system 14. For example, an administrator could initially setup volume 2 of the SAN unit-M to be exclusively accessible by the host-1 1 as long as the administrator acknowledges that host-1 needs such size of storage volume. The administrator can also setup the host-1 with all information needed to access the storage volume 2 of the SAN unit-M. Finally, the host-1 can access to the storage volume 2 of SAN unit-M directly without going through the control management system 3.

The present invention also discloses a mechanism of dynamically scaling storage capacity. After the distributed virtual SAN storage pool 11 is built, the host 1 will be operable access to the storage volumes of the SAN units 4, being allocated to the host 1 via the virtual storage pool 11 discussed previously, directly without further involvement of the control management system 3. Therefore, the control management system 3 can continue to handle adding one or more storage unit 4 for the virtual storage service pool 11 of the distributed virtual SAN infrastructure based on-demand without interrupting each of the hosts' 1 normal access to the storage volumes on the assigned SAN units 4. As a result, this guarantees that the distributed virtual SAN storage pool 11 can be dynamically expanded without interrupting normal operations and access of the entire distributed virtual SAN storage infrastructure 11.

The present invention further discloses a technique of providing scalable storage for each host 1. As illustrated in FIG. 6, once the distributed virtual SAN storage pool 11 is constructed, in one embodiment each host 1 can access to one or more SAN units 4 in the storage pool 11 of the distributed virtual SAN infrastructure whenever the hosts 1 made a storage request. For example, a host 1 can access to SAN unit-1, unit-2, and unit-M after the host 1 requests for storage volumes and the control management system 3 subsequently granted each of the requests. This effectively provides scalable storage system for each of the host 1 within the distributed virtual SAN infrastructure of this invention. Further, the distributed virtual SAN infrastructure provides far better scalability than the in-band accessed virtual SAN illustrated in FIG. 8, wherein the scalability of in-band accessed virtual SAN were severely limited by a bottlenecked control management system.

The present invention also discloses a method of storage sharing mechanism. Once the distributed virtual SAN storage pool 11 is built in one embodiment, each SAN unit 4 in the storage pool 11 of distributed virtual SAN infrastructure may hold multiple storage volumes in the form of block data, which can be accessed by one or more hosts 1. Therefore, this allows multiple hosts 1 to share an IP SAN unit 4 by granting and assigning each host to exclusively access particular one or more storage volumes on that IP SAN unit 4. The FIG. 6 demonstrates such an example of the storage sharing, wherein IP SAN unit 2 has three volumes, which named volume 1, volume 2, and volume 3. The block data service modules 6 the IP SAN unit 2" allows volume 1" to be accessed exclusively by a host-1 1 while volume 2" to be accessed exclusively by a host-2 1.

Figure 7:
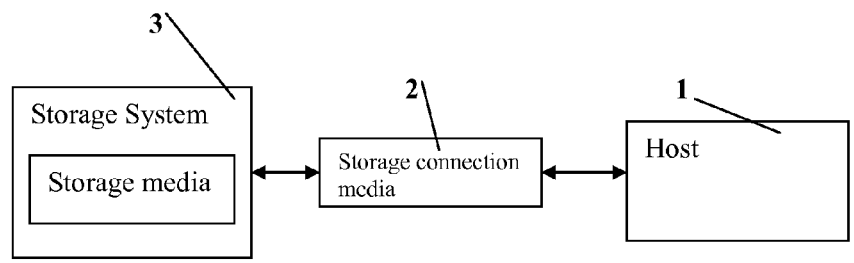
FIG. 7 is a conventional Direct Attached Storage System.

With in-band accessed virtual SAN illustrated in FIG. 8, the control management system could be a performance bottleneck. With distributed virtual SAN of this invention, each of the hosts 1 can directly and independently access to any IP SAN unit 4. Therefore, the performance of storage access for each of the host 1 will not suffered from the bottleneck and can match the performance of direct attached storage system illustrated in FIG. 7 when a high speed network connection is deployed in the distributed virtual SAN infrastructure.

The present invention also illustrates a method of a centralized management of distributed virtual SAN. The management console 10 being executed in the console host 14 and in the distribution control management system 3 is configured to display information relating to all IP SAN units 4 and hosts 1 receive from the control management modules 7 of FIG. 1 via communication to the console support software module 8 of the control management system 3. Therefore, via the displayed information through execution of the management console 10 on the console system 14, users can perform centralized management tasks for the entire distributed virtual SAN storage pool 11, the hosts 1, and the control management system 3, in one embodiment the tasks are performed via web operation menu. With multiple concurrent tasks controlled by the console support software module 8 the control management system 3, the users at the management console 10 can perform a full range of system operations and tasks, where the management console 10 could be a web browser or a non-web based networked console. The mentioned tasks include, for example, creating a file system on a storage volume such as a 60 Giga bytes sized file system, configuring a RAID controller, or transfer one or more files between systems of the CCDSVM including multi-Giga Bytes of file.

These management tasks also include storage configuration, storage volume allocation (assignment) or de-allocation for hosts, storage partitioning and repartitioning, storage, network, and resource usage and activity monitoring, security management, data replication and backup/restore management, fault management and all others. The security management includes setup secure access policies at multiple levels of the virtual SAN infrastructure including at control management system level, at SAN unit level and at host level. The security also can be enforced for users performing administration tasks. For example, authenticating and validating a specific user from a specific system's web browser to access the virtual SAN infrastructure, authenticating a user performing specific task for one or more specific systems such as for SAN unit, host or control management system. For other example, assigning and authenticating a host access to one or more specific SAN units' specific storage volumes, and assigning storage volumes of a SAN unit to be accessed by specific one or more hosts.

In one embodiment, the present invention discloses a method for disaster recovery. The use of DNS or an IP address identification mechanism provides the distributed virtual SAN infrastructure with capability of overcoming the geometric (region) limitation for being deployed both in a cross network domain environment or in a single network domain environment. Therefore, the SAN units, hosts and the control management station could be flexibly clustered on a corporate storage network, a corporate Intranet, LAN, WAN or the Internet. As a result, a disaster recovery plan can have a topology of the distributed virtual SAN infrastructure span across 100 miles range across Internet or Intranet as oppose to the traditional 10-kilometer limitation in a fiber channel environment.

In addition, the disaster recovery plan of distributed virtual SAN infrastructure can be flexibly implemented in an embodiment illustrated in FIG. 10. With this recovery plan, in one embodiment, the host-1 or host-3 can continue to operate even if one of mirrored IP SAN units 3 failed. Also, a spare IP SAN unit 4 can be used to quickly replace a failed IP SAN unit 4 whenever there is a need, for example, when both IP SAN-1 and IP SAN-2 are failed. On the other hand, the hosts also can be organized into a service pool for providing special services, such as distributing video services, distributed database pool, distributed security monitor services, web services and all other services provided across the network or the world wide Web. Therefore, whenever host-1 or host-3 failed, the spare host-2 can be quickly take over the assigned IP SAN storage unit to replace a failed host1 or host-3 to continue providing the services.

It should be noted that the storage of any IP SAN unit can be shared and accessed by multiple hosts. To scale up a host's storage, the host can be assigned to access multiple storage volumes from at least a SAN unit 4.

The implementation of the web-based multi-concurrent tasks support allows the entire distributed virtual SAN infrastructure to be managed and monitored from the management console 10 residing in the console host 14 or in the control management system 3. Specially, many tasks and operations can be done streamlined for computing systems of the virtual SAN infrastructure. The streamlined tasks for example, could be ranged from managing storage configuration and managing networks to configuring each computing system of the virtual SAN infrastructure to provide various services to the client systems across the network. Also, the IP based distributed virtual SAN infrastructure is one type of the central controlled distributed scalable virtual machine (CCDSVM).

Due to the ability control web based multi tasking and the ability of controlling security and controlling user performing various tasks, the software modules of the CCDSVM has created a web based virtual computer user work environment (WCUWE) for a virtual operating system of the CCDSVM. The WCUWE created by the mentioned software modules (control part of the WCUWE) on the control management station 3 which includes console support software modules (web server interface) 8, control management modules 7 and web sewer software modules 15 on the control management system 3, and together by the service modules 8 (agent part of the WECUWE) on each system unit 4. Like the computer user work environment (CUWE) running on top of a native operating system kernel, each part of the WCUWE also running on the top of a native operating system kernel.

In one embodiment, a single standalone control system is a special embodiment of the CCDSVM, where the CCDSVM has degenerated into a single standalone control system 3 without any system unit 4.

Figure 12:
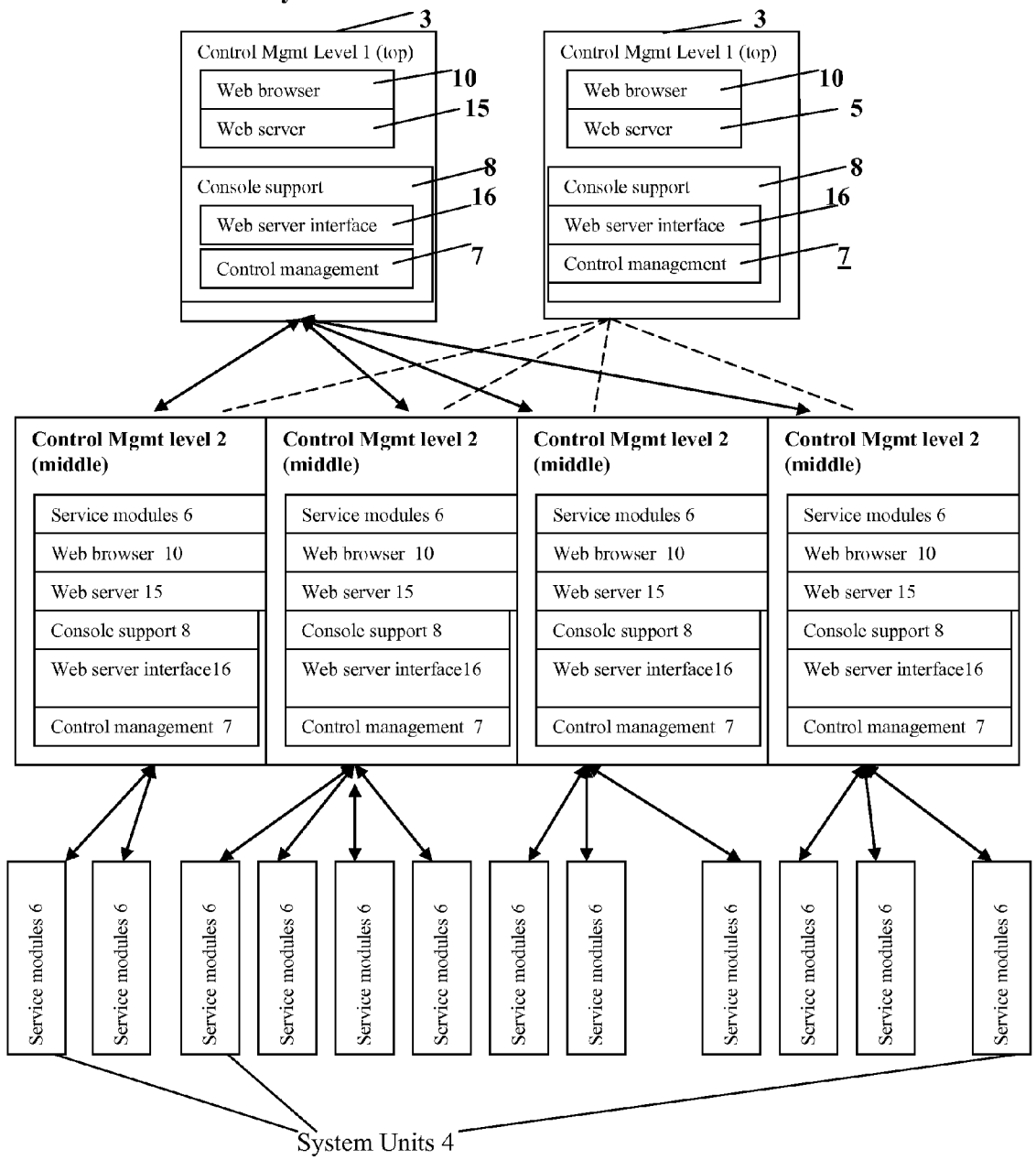
FIG. 12 illustrated an embodiment of a multi-layered central controlled distributed scalable virtual server, where a top level control system controls one or more middle level (level-2) control systems and each middle level control system can controls plurality of system units such as IP SAN units and spare IP SAN units. Therefore, the level 2 control system must have related software modules for both the control system and system unit 3 such that the middle level control system has double roles including a role as a system unit to the top level control system for executing a request received therefrom and sending response thereto, and a role as the control system to control the system units bellow its level.

In another embodiment, one or more service pools of the CCDSVM can be organized into multi-layered structure as illustrated in Fig. 12, where a top level control system controls one or more middle level (level-2) control systems and each middle level control system can control a plurality of system units such as IP SAN unit and spare IP SAN unit. Therefore, the level 2 control system must have related software modules for both the control system and system unit 3 such that the middle level control system has double roles including a role as a system unit to the top level control system for executing a request received therefrom and sending response thereto, and a role as the control system to control the system units bellow its level.

What is claimed is:

1. A web based virtual operating system operable with a web system that has at least a control server, a plurality of storage servers, and a plurality of application servers, and is accessible to a plurality of end-user computing devices,
   the web based virtual operating system being a computer program product, stored in a non-transitory computer readable medium, the virtual operating system comprising:
   program instructions, when executed by the control server, for the control server to:
      control automatically forming a storage service pool via communicating with each of the storage servers across a first communication network and automatically forming a plurality of application service pools via communicating with each of the application servers across a second communication network;
      display an UI ("user interface"), via a web page comprising information of the web system, on each of the end-user computing devices, allowing a user of the each of the end-user computing devices via the displayed information of the web system to perform a task to be run on targeted one or more of the storage servers or the application servers; and
      activate a web multitask support mechanism to execute the task received from the each of the end-user computing devices in the background,
         wherein the execution of the task in the background does not cause to interfere in the display of the information of the web system on the each of the end-user computing devices, thus allows at least a second task to be performed immediately following the performing of the task without waiting for completion of the execution of the task during a regular network traffic time.

2. The virtual operating system of claim 1, further comprising program instructions for executing a storage service pool automatic construction protocol between the control server and each of the storage servers to form the storage service pool across the first communication network of a corporate storage network, local area network (LAN), wide area network (WAN), corporate Intranet, or the Internet.

3. The virtual operating system of claim 1, further comprising program instructions for executing an application service pool automatic construction protocol between the control server and each of the application servers to assign, based on service type, the each of the application servers into one of the application service pools across the second communication network of a local area network (LAN), wide area network (WAN), corporate Intranet, or the Internet.

4. The virtual operating system of claim 1, further comprising program instructions for each of the end-user computing devices to be operable for executing a web browser to display the UI via the web page received from the control server, and for sending the task to the control server.

5. The virtual operating system of claim 1, further comprising program instructions for allowing to perform an admin task of requesting for a storage space in response to storage requirement of one of the application servers, thereby causing the control server via the storage service pool to identify one of the storage servers having an available storage space for the request.

6. The virtual operating system of claim 1, further comprising program instructions for allowing to perform an admin task of monitoring status of storages, networks, processors, processes or threads for any one of the application servers or for any one of the storage servers.

7. The virtual operating system of claim 1, wherein said execution of the task in the background comprises program instructions for:
   storing information of a task into a user space task list before executing the task;
   providing a response immediately to the each of the end-user computing devices from which the task is received regardless of whether the task is completed or not, and distributing the task to the targeted one or more of the storage servers or the application servers for carrying out the task; and
   cleaning up the stored task information in response to the completion of the task;
   wherein the web multitasking support mechanism invokes at least a lock to protect the execution of the task.

8. The virtual operating system of claim 5, further comprising program instructions to be executed by the one of the application servers for direct access to the available storage space on the one of the storage servers without going through the control server after authorized by the control server.

9. The virtual operating system of claim 1, further comprising program instructions to be executed by each of the application servers for receiving, executing, and responding to a task distributed from the control server, and for providing a specific application service to any one of the end-user computing devices requesting the application service.

10. The virtual operating system of claim 1, further comprising program instructions to be executed by each of the storage servers for receiving, executing, and responding to a task distributed from the control server and for providing storage service to any one of the application servers being authorized access to the storage service.

11. The virtual operating system of claim 1, further comprising program instructions for assigning the user of the each of the end-user computing devices access to a storage space of predetermined size.

12. The virtual operating system of claim 1, further comprising program instructions for allowing to perform an admin task of partitioning storage volume for a storage device of one of the storage servers, or allocating or de-allocating a storage volume being partitioned on a storage device of one of the storage servers.

13. The virtual operating system of claim 1, further comprising program instructions for allowing the user of the each of the end-user computing devices to request access to an application service of a web, video, file, or database service provided by one of the application servers in one of the application service pools.

14. The virtual operating system of claim 1 further comprising program instructions for allowing to perform an admin task of replicating, backing up or restoring data being stored in any one of the storage servers.

15. The virtual operating system of claim 11, further comprising program instructions for allowing the user of the each of the end-user computing devices to create a directory ("folder") structure for the storage space; and further comprising program instructions for allowing access to the folder for storing a file therein or retrieve a file therefrom.

16. The virtual operating system of claim 1, further comprising program instructions for
assigning permission for permitting a user of the each of the end-user computing devices access to one or more of the application servers or access to one or more of the storage servers.

17. A web system operated via a virtual operating system for a plurality of end-user computing devices access, the web system comprising:
at least a control server,
a plurality of storage servers being automatically provisioned to form a storage service pool, and
a plurality of application servers being automatically provisioned to form a plurality of application service pools, wherein each of the application service pools comprises one or more of the application servers for providing a specific service; and
a program code of the virtual operating system that, when executed by the control server, configures the control server to:
control automatically forming the storage service pool across a first communication network and automatically forming the plurality of application service pools across a second communication network;
display an UI ("user interface"), via a web page comprising information of the web system, on each of the end-user computing devices, allowing a user of the each of the end-user computing devices via the displayed information of the web system to perform a task to be run on targeted one or more of the storage severs or the application servers; and
activate a web multitasks support mechanism to execute the task received from the each of the end-user computing devices in the background,
wherein the execution of the task in the background does not cause to interfere in the display of the information of the web system on the each of the end-user computing devices, thus allows at least a second task to be performed immediately following performing of the task without waiting for completion of the execution of the task during a regular network traffic time;
a program code of the virtual operating system, when executed by each of the storage servers, for the each of the storage servers to
receive, execute, and respond to any task distributed from the control server and to provide storage service to any one of the application servers being authorized access to the storage service; and
a program code of the virtual operating system, when executed by each of the application severs, for the each of the application servers to:
receive, execute, and respond to any task distributed from the control server, and to provide a specific application service to any one of the end-user computing devices requesting the application service.

18. The web system of claim 17, wherein the first communication network that is one of a corporate storage network, local area network (LAN), wide area network (WAN), corporate Intranet, or Internet; and wherein the second communication network is one of a local area network (LAN), wide area network (WAN), corporate Intranet, or the Internet.

19. The web system of claim 17, wherein said execution of the task in background comprises:
storing information of a task into a user space task list before executing the task;
providing a response immediately to the each of the end-user computing devices from which the task is received regardless of whether the task is completed or not, and distributing the task to the targeted one or more of the storage servers or the application servers for carrying out the task; and
cleaning up the stored task information in response to the completion of the task; and
wherein the web multitasking support mechanism invokes at least a lock to protect the execution of the task.

* * * * *